(12) United States Patent
Xu et al.

(10) Patent No.: US 12,260,635 B2
(45) Date of Patent: Mar. 25, 2025

(54) COMPUTER-EXECUTABLE METHOD RELATING TO WEEDS AND COMPUTER SYSTEM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 409 days.

(21) Appl. No.: 17/790,131

(22) PCT Filed: Dec. 4, 2020

(86) PCT No.: PCT/CN2020/134072
§ 371 (c)(1),
(2) Date: Jun. 30, 2022

(87) PCT Pub. No.: WO2021/147528
PCT Pub. Date: Jul. 29, 2021

(65) Prior Publication Data
US 2023/0044040 A1 Feb. 9, 2023

(30) Foreign Application Priority Data
Jan. 23, 2020 (CN) .......................... 202010076015.1

(51) Int. Cl.
*G06V 10/82* (2022.01)
*A01B 79/00* (2006.01)
(Continued)

(52) U.S. Cl.
CPC .......... *G06V 20/188* (2022.01); *A01B 79/005* (2013.01); *G06T 7/0014* (2013.01);
(Continued)

(58) Field of Classification Search
CPC .......... F24S 50/20; F24S 30/425; F24S 20/30; F04S 23/31; Y10S 436/81; Y10S 435/97
See application file for complete search history.

(56) References Cited

U.S. PATENT DOCUMENTS 6,199,000 B1 * 3/2001 Keller .................. A01B 79/005
342/357.62
6,505,437 B1 * 1/2003 Johnstone ............. A01M 21/04
47/1.7
(Continued)

FOREIGN PATENT DOCUMENTS

CN 1945601 4/2007
CN 108304796 7/2018
(Continued)

OTHER PUBLICATIONS

"International Search Report (Form PCT/ISA/210) of PCT/CN2020/134072", mailed on Mar. 3, 2021, with English translation thereof, pp. 1-4.
(Continued)

Primary Examiner — Yosef Kassa
(74) Attorney, Agent, or Firm — JCIPRNET

(57) ABSTRACT

A computer-executable method relating to weeds, and a computer system. The method comprises: receiving an image (S11); recognizing one or more plants in the image in order to obtain the classification and/or names of the plants, and determining whether the plants are weeds (S12); and in response to determining that at least one plant is a weed, outputting information indicating that the at least one plant is a weed (S13).

18 Claims, 5 Drawing Sheets

(51) Int. Cl.
  *G06T 7/00* (2017.01)
  *G06V 10/764* (2022.01)
  *G06V 20/10* (2022.01)
  *G06V 20/40* (2022.01)

(52) U.S. Cl.
  CPC ............ *G06V 10/764* (2022.01); *G06V 10/82* (2022.01); *G06V 20/41* (2022.01); *G06T 2207/20081* (2013.01); *G06T 2207/20084* (2013.01); *G06T 2207/30188* (2013.01); *G06V 2201/07* (2022.01)

(56) References Cited

U.S. PATENT DOCUMENTS

| | | | | |
|---|---|---|---|---|
| 7,099,004 B2* | 8/2006 | Masten | ...................... | G01J 3/42 356/328 |
| 7,417,731 B1* | 8/2008 | Masten | ...................... | G01J 3/28 356/328 |
| 8,924,239 B1* | 12/2014 | Kurple | ................... | G16H 20/60 705/2 |
| 9,128,049 B2* | 9/2015 | Groz | ................... | G01N 21/3151 |
| 10,120,543 B2* | 11/2018 | Sugumaran | ........... | G06V 20/188 |
| 10,226,036 B2* | 3/2019 | Guice | ..................... | F24S 50/20 |
| 10,455,826 B2* | 10/2019 | Palomares | ............. | A01B 39/18 |
| 10,577,103 B2* | 3/2020 | Cantrell | ................ | G05D 1/0011 |
| 10,845,810 B2* | 11/2020 | Flajolet | ................ | G05D 1/0094 |
| 2019/0147249 A1 | 5/2019 | Kiepe et al. | | |

FOREIGN PATENT DOCUMENTS

| | | |
|---|---|---|
| CN | 109961024 | 7/2019 |
| CN | 110555416 | 12/2019 |
| CN | 111325240 | 6/2020 |

OTHER PUBLICATIONS

"Written Opinion of the International Searching Authority (Form PCT/ISA/237) of PCT/CN2020/134072", mailed on Mar. 3, 2021, pp. 1-4.

* cited by examiner

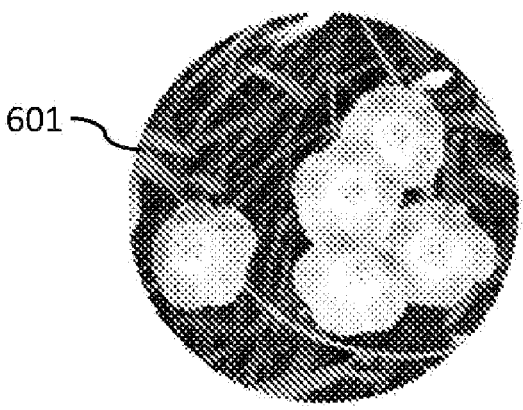

601

602 — Convolvulus arvensis

603 — Solanum Convolvulaceae  Convolvulus  Convolvulus

604 — Alias: small bindweed, Chinese bindweed, arrow leaf bindweed, wild morning glory, lala wan 605 — scientific name: Convolvulus arvensis 606 — <u>Details</u>   Control   Atlas 607 — ! Noxious plants!

608 — Convolvulus arvensis spread very quickly, making their invasion difficult to control. Convolvulus arvensis is highly toxic, especially its seeds 609 — learn more

FIG. 6

COMPUTER-EXECUTABLE METHOD RELATING TO WEEDS AND COMPUTER SYSTEM

CROSS-REFERENCE TO RELATED APPLICATION

This application is a 371 of international application of PCT application serial no. PCT/CN2020/134072, filed on Dec. 4, 2020, which claims the priority benefits of China Patent Application No. 202010076015.1, filed on Jan. 23, 2020. The entirety of each of the above-mentioned patent applications is hereby incorporated by reference herein and made a part of this specification.

BACKGROUND

Technical Field

The present disclosure relates to the field of computer technology, and in particular, to a computer-executable method related to weeds and a computer system.

DESCRIPTION OF RELATED ART

In the field of computer technology, there are many applications for detecting and recognizing objects, such as applications for recognizing plants. These applications typically receive images (including static images, dynamic images, videos, etc.) containing at least a portion of a plant to be recognized from a user, and recognize the classification and/or name of the plant in the image based on a pre-trained plant classification and recognition model. The term "classification" as used herein refers to a botanical classification, which may include phyla, classes, orders, families, genera, species, and the like. The "name" referred to herein may include the common name, alias, vernacular name (informal name), scientific name, etc. of the plant.

In some cases, there are weeds growing near the target plant that the user wants to recognize. In some cases, the user wants to recognize weeds. Weeds include common weeds, invasive weeds and noxious weeds. Invasive weeds are non-native and exotic species. When the invasive weeds make invasion successfully, their growth is difficult to control and often suppresses or displaces native species, forming monodominant populations and endangering the ecology of native species. Harmful weeds mainly refer to weeds that may cause harm to humans or animals, including, for example, poisonous weeds, allergenic weeds, and thorny weeds. Invasive and noxious weeds are often collectively referred to as malignant weeds. Weeds other than malignant weeds may be called common weeds.

SUMMARY

It is a purpose of the present disclosure to provide a computer-executable method related to weeds and a computer system.

According to a first aspect of the present disclosure, there is provided a computer-executable method related to weeds, including: receiving an image; recognizing one or more plants in the image to obtain a classification and/or name of the plant, and determining whether the plant is a weed; and in response to determining that at least one plant is a weed, outputting information indicating that the at least one plant is a weed.

According to a second aspect of the present disclosure, there is provided a computer-executable method related to weeds, including: receiving an image; recognizing a classification and/or name of weeds in the image based on a pre-trained neural network model, and determining whether the weed is a malignant weed, and the neural network model is trained based on a pre-established weed sample library; and in response to determining that the weed is a malignant weed, outputting a warning message.

According to a third aspect of the present disclosure, there is provided a computer-executable method related to weeds, including: receiving an image; recognizing a classification and/or name of weeds in the image based on a pre-trained neural network model, and the neural network model is trained based on a pre-established weed sample library; and outputting the classification and/or name of the weed, and at least one of the following: current growth stage, hazard, methods for avoiding hazard, control measures, and recommended time to perform control.

According to a fourth aspect of the present disclosure, there is provided a computer system related to weeds, including: one or more processors; and one or more memories configured to store a series of computer-executable instructions and computer-accessible data associated with the series of computer-executable instructions, and when the series of computer-executable instructions are executed by the one or more processors, the one or more processors perform the method described above.

Other features of the present disclosure and advantages thereof will become apparent from the following detailed description of exemplary embodiments of the present disclosure with reference to the accompanying drawings.

BRIEF DESCRIPTION OF THE DRAWINGS

The accompanying drawings, which form a part of the specification, illustrate embodiments of the present disclosure and together with the description serve to explain the principles of the present disclosure.

The present disclosure may be more clearly understood from the following detailed description with reference to the accompanying drawings.

FIG. 6 is a schematic view illustrating outputting information in a method according to an embodiment of the present disclosure.

Figure 1:
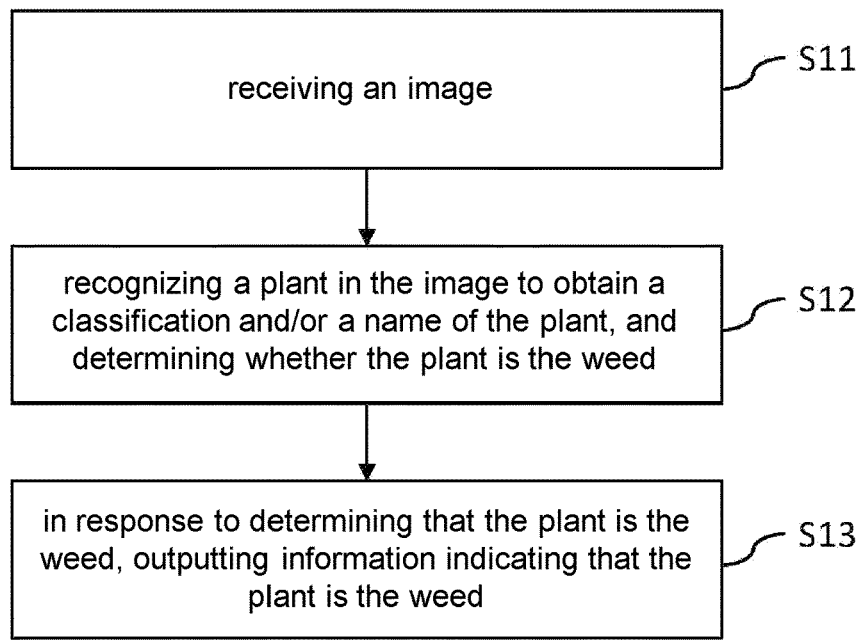
FIG. 1 is a flowchart schematically illustrating at least a portion of a computer-executable method related to weeds according to an embodiment of the present disclosure.

Note that, in the embodiments described below, the same reference numerals are used in common between different drawings to denote the same parts or parts having the same function, and repeated descriptions thereof may be omitted. In this specification, like numerals and letters are used to refer to like items, so once an item is defined in one figure, it need not be discussed further in subsequent figures.

DESCRIPTION OF THE EMBODIMENTS

Various exemplary embodiments of the present disclosure will be described in detail below with reference to the accompanying drawings. It should be noted that the relative arrangement of the components and steps, the numerical expressions and numerical values set forth in these embodiments do not limit the scope of the present disclosure unless specifically stated otherwise. In the following description, in order to better explain the present disclosure, numerous details are set forth, however it should be understood that the present disclosure may be implemented without these details.

The following description of at least one exemplary embodiment is merely illustrative in nature and is in no way intended to limit the disclosure, its application or uses in any way. In all examples shown and discussed herein, any specific value should be construed as illustrative only and not as limiting.

Techniques, methods, and apparatus known to those of ordinary skill in the relevant art may not be discussed in detail, but where appropriate, such techniques, methods, and apparatus should be considered part of the specification.

Referring to FIG. 1, FIG. 1 is a flowchart of a computer-executable method 100 related to weeds according to an embodiment of the present disclosure. The computer application performing the method 100 may be an application that provides plant recognition functionality to a user. When the application recognizes weeds, the application may prompt the user that there are weeds. In some embodiments, after recognizing weeds, the application may also provide information to the relevant people and/or weed control departments/individuals. Steps S11 to S13 included in the method 100 are described as follows.

Step S11: An image is received. The user may input images including the plants to be recognized into the application for the application to recognize the classification and/or name of the plants. The image may include one or more plants, and the application may recognize one or more plants in the image. Each plant presented in the image may include the entire plant or only a portion of the plant. For example, the image may include any one of at least one of the roots, stems, leaves, flowers, fruits, and seeds of the plant to be recognized or a combination of the above. The image may be previously stored by the user, captured in real time, or downloaded from the Internet. The image may be presented visually in any forms, such as a static image, a dynamic image, and a video.

Step S12: One or more plants in the image is recognized to obtain the classification and/or name of the plant, and it is determined whether the plant is a weed. The recognition in this step may include any known method for image-based plant recognition. For example, a classification and/or name of a plant may be recognized by a computing device and a pre-trained (or "trained") classification and recognition model. In an embodiment, before using the classification and recognition model for recognition, object detection may be performed on the image, and then the classification and recognition model is used to respectively recognize one or more detected targets. For example, an attention model may be used to recognize the area of each plant in the image, and then recognize each area separately. Those skilled in the art should understand that if the received image does not contain plants, the recognition may not be performed or the user is notified that the recognition fails, or a plant that is closest to the received image (or the target in the image) may be recognized.

A trained classification and recognition model may be established based on a neural network (e.g., deep convolutional neural network (CNN) or deep residual network (Resnet), etc.) for recognizing the classification and/or name of plants. The establishing process of the trained classification and recognition model is described as follows. A certain number of image samples labeled with the classification and/or name of the plant are obtained for each plant classification, and the number of image samples prepared for each plant classification may be the same or different. The labeled image samples are divided into a training sample set for training the classification and recognition model and a test sample set for testing the training results. Generally, the number of samples in the training sample set is significantly greater than the number of samples in the test sample set. Those skilled in the art should understand that the number of samples in the training and test sample sets may be adjusted as required. The training sample set is utilized to train the neural network, and the test sample set is utilized to test the output accuracy of the trained neural network. If the output accuracy does not meet the requirements, the number of image samples in the training sample set is increased, and the updated training sample set is utilized to retrain the neural network until the output accuracy of the trained neural network meets the requirements. If the output accuracy meets the requirements, the training ends. In this way, the trained neural network whose output accuracy meets the requirements may be used for recognizing one or more plants in the image in step S12 to obtain the classification and/or name of the one or more plants.

After recognizing the plant to obtain the classification and/or name of the plant, it is further determined whether the plant is a weed based on the classification and/or name of the plant. In an embodiment, the obtained classification of the plant includes an obtained species of the plant. Correspondingly, it is determined whether the species of the plant is pre-recorded as a weed, and if so, the plant is determined as a weed. Otherwise, it may be determined whether there are other species that are pre-recorded as weeds among other species under the classification "genus" at the higher level of the species of the plant, and if so, information is output to prompt the user to input additional image containing the plant for further determining whether the plant is a weed. The output information may be, for example, "please take a picture close to the plant" or "please take another picture from a different angle for more accurate recognition" and the like. In an embodiment, information may be output to prompt the user to input additional images containing the feature part of the plant, so that the application may obtain more morphological features of the feature part. The feature parts of plants of different classifications may be different. For example, for a first plant and a second plant of the same genus, the difference between them may lie in the detailed morphological features of the flower, while the difference in other parts may be small. Under the circumstances, the feature part may include flowers. Information may be output to prompt the user to input additional images containing the morphological features of the flower (or even details of the flower) of the plant. The classification and/or name of the plant may be re-recognized according to the additional image input by the user (or according to the additional image input by the user and the image received in step 11) to determine whether the plant is a weed. The process of determining whether a plant is a weed is described above with a specific example. Those skilled in the art should understand that the plant classification obtained by recognizing plants may not be at the level of "species", for example, it may be a subspecies at a lower level than a species, or a genus at a higher level than a species.

A database, data sheet or data file may be established in advance to record those plants that have been recognized as weeds. Databases, data sheets, or data files documenting weeds may also be obtained in advance from external sources, such as government-published data. Data related to common weeds and noxious weeds may be relatively fixed over a considerable period of time and may be the same throughout different geographic areas. Data related invasive weeds usually need to be updated in time and often vary from one geographic area to another. Therefore, these data documenting weeds need to be updated in a timely manner, whether they are self-established or obtained from external sources.

Figure 4:
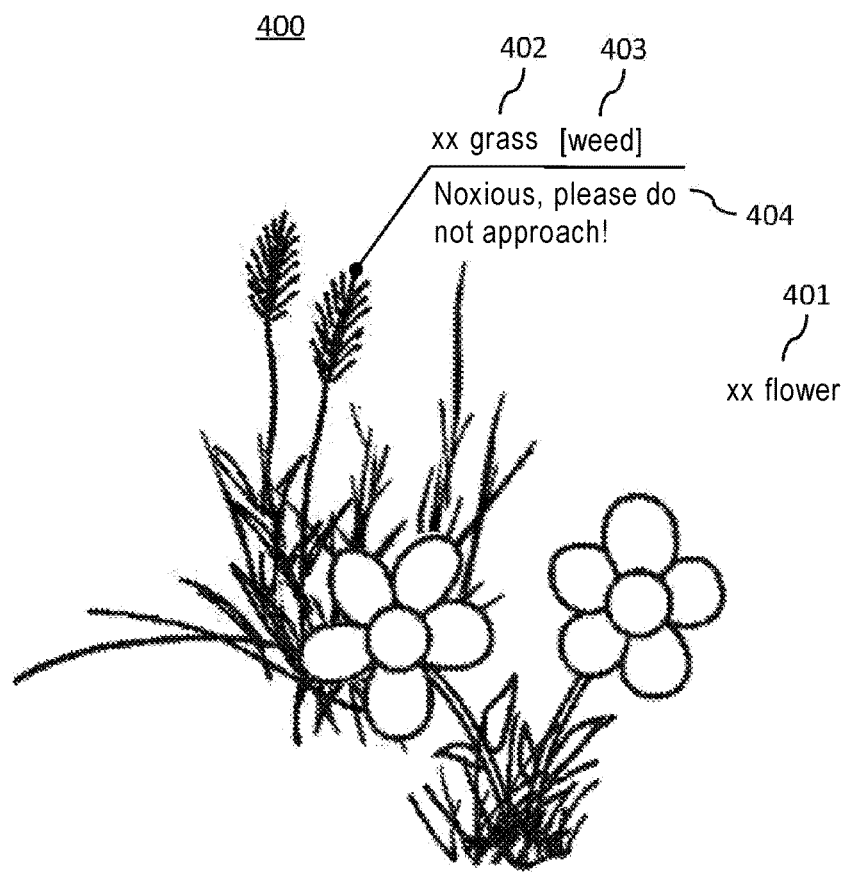
FIG. 4 is a schematic view illustrating outputting information in a method according to an embodiment of the present disclosure.
Figure 5:
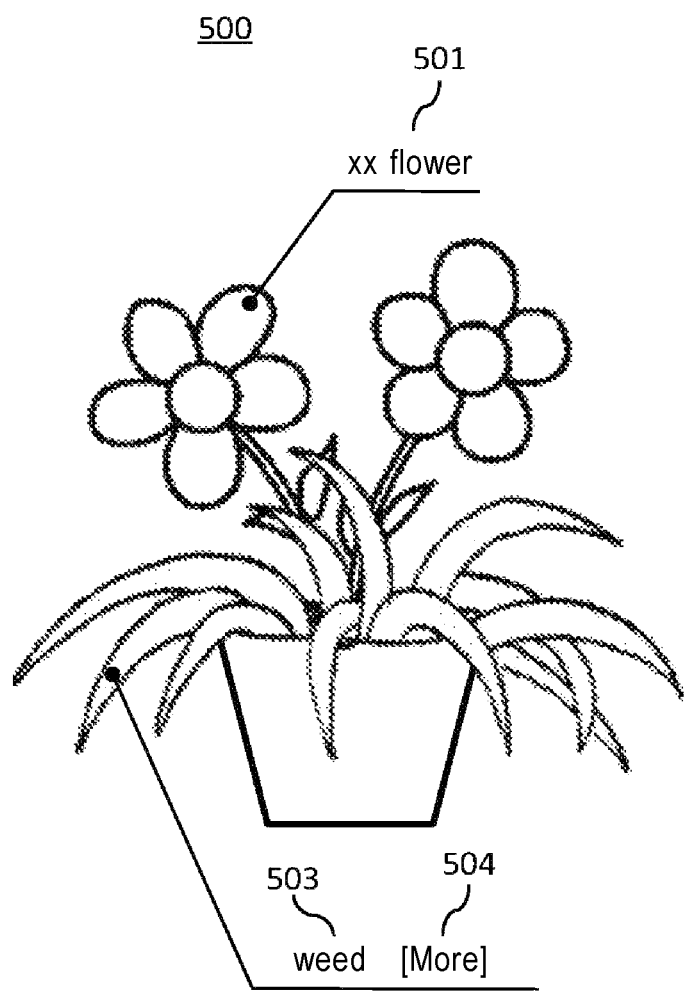
FIG. 5 is a schematic view illustrating outputting information in a method according to an embodiment of the present disclosure.

Step S13: If at least one plant is determined to be a weed among the one or more plants in the image, information indicating that the at least one plant is a weed is output. The screen 400 shown in FIG. 4 may be one example of the output of the application executing the method 100. In this example, the application not only outputs information indicating that the at least one plant is a weed, but also outputs the classification and/or name of the at least one plant. In the steps described above, the application receives the image input by the user and recognizes the plant in the image, recognizes the classification and/or names of plants located in the foreground and background of the image, and outputs the recognized classification and/or names. For example, text 401 is shown on the screen 400 to output the classification and/or name "xx flower" of the recognized plant in the foreground, and text 402 is shown to output the classification and/or name "xx grass" of the recognized plant in the background. In addition, in step S12, it is further determined that the plant in the background is a weed, so text 403 is shown on the screen 400 to prompt the user that the at least one plant is a weed. The screen 500 shown in FIG. 5 may be yet another example of the output of the application executing the method 100. In this example, the application only outputs information indicating that the at least one plant is a weed, but does not output the classification and/or name of the at least one plant. On the screen 500, text 501 is shown to output the classification and/or name of the plant "xx flower" to be recognized, while text 503 is shown to prompt the user that at least one plant located near the plant to be recognized is a weed, and text 504 may display more information. In an embodiment, if the plant recognized by the application is no plant other than weeds, the information indicating that the recognized plant is a weed may be output directly in the form of the screen 600 shown in FIG. 6 instead of the form of the screen 400 or 500.

In an embodiment, information indicating that the weed is a malignant weed may be output in the case of malignant weeds to avoid harm to the user. In response to determining that the at least one plant is a weed, it is determined whether the weed is a malignant weed; and in response to determining that the weed is a malignant weed, information indicating that the weed is a malignant weed is output. Malignant weeds may include noxious weeds, thorny weeds, allergenic weeds, and invasive weeds. The data in the aforementioned database, data sheet or data file for documenting weeds not only may record whether a plant is classified as a weed, but also record the nature of the weed, such as whether the plant is a noxious weed, a thorny weed, an allergic weed, or an invasive weed, etc. By querying the data of these recorded weeds, it is possible to determine whether the weeds are noxious weeds. An example of outputting information indicating that the weeds are malignant weeds may be derived from FIG. 4, the text 404 is shown on the screen 400 to prompt the user that the weeds are noxious weeds, and the user may even be warned not to approach the plant as shown in this example.

In some embodiments, the application may, in response to a user's operation, re-recognize weeds based on a pre-established weed feature database to obtain a revised classification or a more detailed classification of weeds, and output the re-recognition result (including revised classifications or more detailed classifications, and/or the names corresponding to such classifications). Taking the example shown in FIG. 4 as an example, the user's operation may be directed at a portion of the screen 400 where weeds are displayed, or may be directed at an area where the text 402 to 404 are shown. Operations may include one click, double-clicks, touches, stretch-to-zoom, and swipes.

In some embodiments, the pre-established weed feature database includes various features of individual weeds, such as growth habit/environmental features, overall morphological features, and detailed morphological features. Each feature of each weed may include the feature of the weed at respective growth stages, for example, the external detailed morphological features may include the external detailed morphological features of the seedling stage and the mature stage of the weeds. Feature data may be established respectively for different parts of each weed, such as roots, stems, leaves, flowers, fruits, and seeds. The form of each feature may be a picture (or picture and text) that can reflect the feature. In addition, the weed feature database may highlight the distinguishing features of similar weeds. For example, the growth habit/environment and overall appearances of weed 1 and weed 2 are similar, but there are subtle differences in the detailed appearances of their fruits. Under the circumstances, the detailed morphological features of the fruits of weed 1 and weed 2 may be highlighted in the weed feature database. The way to highlight the description of a feature may be to use more pictures (or pictures and text) to describe the feature than other features. In an embodiment, re-recognizing the weeds may be to extract the features from the weed feature database that match the classification, the classifications at lower levels, and the kinship classifications of the weeds recognized in step S12, and compare and/or match the extracted feature with the feature of the weeds in the image, so as to recognize the weeds again, thereby obtaining a revised classification or a more detailed classification of the weeds, and/or a name corresponding to this classification. In an embodiment, the re-recognition may be based on a neural network model, which is pre-trained based on a pre-established weed feature database, and the pictures embodying each feature in the database are the pre-trained samples. Since the neural network model is trained based on a weed-specific database (also a sample database in this embodiment), the accuracy and preciseness for weeds recognition may be higher than the neural network model used for the recognition in step S12. Accordingly, a revised classification or a more detailed classification of weeds, and/or a name corresponding to this classification may be obtained.

After re-recognition, the result of re-recognition may be output. In addition, features in the form of pictures and/or text matching the classification may be extracted from the weed feature database and also output to the user as part of the re-recognition result. The screen 600 shown in FIG. 6 may be an example of performing re-recognition in response to a user's operation and outputting the re-recognition result. The screen 600 may include common forms 601, common names 602, re-recognized classifications 603, aliases 604, scientific names 605 of weeds, and user-selectable options 606 (including "details", "control" and "atlas"). In the illustrated drawing, the option "details" is selected, and a warning 607 indicating hazard of weeds and a description 608 of the hazard may be displayed below the option 606. A user-operable area 609 is also displayed below, and in response to the user's operation in the user-operable area 609, more information about the weed may be displayed. In addition, for example, if the option "control" is selected, the control measures directed at the weed may be displayed. For example, when the option "atlas" is selected, a plurality of pictures of the weed may be displayed, at least a portion of which may be derived from features in the weed feature database that match the classification of the weed.

In an embodiment, the application may not wait for the user's operation, but re-recognize the weeds based on the pre-established weed feature database as soon as the weeds are recognized, so as to obtain the revised classification or a more detailed classification of the weeds, and the re-recognition result is output. In an embodiment, the application may not wait for the user's operation, but display a screen for outputting information of the weeds, such as screen 600, as soon as the weeds are recognized. In this embodiment, before outputting the information weed, the application may already perform re-recognition, for example, the output in the screen 600 is the result of re-recognition. It is also possible not to perform re-recognition, for example, the output in the screen 600 is the result of the recognition in step S12, and the re-recognition and result output will be performed after the user operates the area 609.

In an embodiment, after determining that at least one plant is a weed, the location of the plant is also recognized. If the recognized location is a private place, the classification, and/or name, hazard and control measures of weeds are output. For example, in the example shown in FIG. 5, the place where weeds are present is identified as a flowerpot, and the flowerpot may be determined as a private place. In private places, the work of weed control is normally done by individuals. Therefore, the application may output the hazards and control measures of weeds to users, and give users warnings and guidance. If the identified location is a public place, the contact information of government departments, enterprises, institutions, and/or individuals related to weed control are output. For example, in the example shown in FIG. 4, the identified place where the weeds are located may be a forest park, a garden in a residential area, or a green belt land by the roadside, etc., and such places may be determined as public places. In public places, the work of weed control is normally carried out by responsible departments/individuals. Therefore, the application may output the contact information of government departments, enterprises, institutions, and/or individuals related to weed control in the public place to users, and the user may report the presence of weeds in a certain geographic location/geographical area to the responsible department/individual or seek guidance/help through the contact information. In the step of recognizing the location of the weeds described above, the environment around the weeds may be recognized through the image, such as whether there are flower pots, home/office supplies, roadside, fences, large stones, etc., to determine whether the location is a private or public place. The identified surrounding environment may also be combined with the geographic location of the captured image, such as in a residential area, beside a road, in a park, etc., to determine whether the location is a private or public place.

Hazards of weeds output to users may include hazards to humans, animals, plants, and/or the environment. Examples of hazards to humans include: a certain weed can produce large amounts of pollen that might cause severe pollen allergies and, at worst, asthma. Examples of hazards to animals include: the stems and leaves of certain weeds contain toxic substances. If the stems and leaves are ingested in large quantities, regardless of whether they are fresh or dried, horses will experience symptoms such as difficulty breathing, lung congestion, pupil dilation, salivation, sweating, and even die. Examples of hazards to plants include: certain weeds often invade fields, vegetable gardens, gardens, lawns, and open spaces, affecting the growth of seedlings of other plants and reducing crop yields; certain weeds compete with other species for sunlight, water, and nutrients, affecting the normal growth of other plants and local biodiversity, resulting in crop yield reduction. Among the loss caused by hazards weeds, corn and soybean losses might be as high as 50% of the desired yield. Examples of environmental hazards include: a certain weed is a common weed worldwide, the reproductive capacity of such weed is high, a single plant may produce 240,000 seeds, and the seed viability exceeds 40 years and is difficult to eradicate; a certain weed is highly adaptable to different environments and has high reproductive capacity, each plant may produce about 70,000 to 100,000 seeds per year, the weeds are widely propagated by the wind, and these seeds have 30 to 40 years of vitality; a certain weed grows rapidly, such weed will suppress the growth of native plants and destroy the original ecological environment.

In an embodiment, in response to determining that at least one plant is a weed, the application outputs information about weeds to government departments, enterprises, institutions, and/or individuals related to weed control, so that the application may automatically report the presence of weeds to departments/individuals related to weed control. In an embodiment, even if the classification (e.g., species) of the plant recognized in step S12 is not pre-recorded as weeds, it is possible to further determine whether other classifications (e.g. other species) subordinate to the higher-level classification (e.g. genus) of the classification are pre-recorded as weeds. If other classifications (such as other species) are pre-recorded as weeds, information is output to government departments, enterprises, institutions, and/or individuals related to weed control to inform the presence of family of weeds.

In some embodiments, the application may output report to the relevant people, or to departments/individuals related to weed control only when malignant weeds are identified. In an embodiment, in response to determining that the weed is a malignant weed, the classification of the weed and the geographic location where the weed is identified are output to a geographically relevant people. In the meantime, at least one of the following items related to weeds may also be output: common forms, forms that match the current growth stage, hazard, and methods to avoid hazards. Geographically relevant people may be those located near the geographic location where the weed is identified, those associated with the administrative division where the weed is identified, those who frequently visit/visited/want to visit the geographic location where the weed is identified (for example, such information may be obtained based on an individual's itinerary data). The geographic location where the weeds are identified may be determined based on the geographic location where the image is taken (e.g., such information may be obtained from the metadata of the image). The means of outputting the above-mentioned information to people may include making voice calls, sending SMS messages, emails, messages on social networks, and the like. The geographic location output to people about where the weeds are identified may be absolute geographic locations (such as longitude and latitude), relative geographic locations (such as "southeast of the city"), and/or names of the place (such as "xx park", "xx section" of "xx river").

In some embodiments, in response to determining that the weed is a malignant weed, the classification of the weed, the geographic location of the weed, and the control measures are output to government departments, enterprises and/or individuals related to weed control. These departments/individuals related to weed control may refer to this information to make responses, such as implementing control measures or giving guidance to residents near the weeds. For example, if the weeds are identified as *convolvulus*, the control measures that may be output may include: 1. At the seed stage, mulching is used to inhibit the germination of weed seeds; 2. At the seedling stage, herbicides may be used for effective elimination; 3. Planting rival plants for competition, especially pumpkins, melons and other plants with thorny vines, to reduce the growth space of weeds; 4. Ploughing the fields (e.g., farms) diligently or pruning (e.g., grasslands) frequently to supress the growth of weeds; 5. Scalding the weeds with boiling water.

In an embodiment, the current growth stage of the weeds may further be output to the relevant departments/individuals, and the control measures are control measures matched with the current growth stage. The control measures may be optimal removal measures, and the recommended implementation time and/or implementation urgency of optimal removal measures may also be output. For example, if the growth stage of the identified *convolvulus* is the seedling stage, the output control measures may include: herbicides may be used for effective removal. In addition, since the seedling stage is a short period of time, it may be output that the recommended implementation time is within 20 days, and/or the implementation urgency is high.

The means of outputting the above-mentioned information to the departments/individuals related to weed control may include making voice calls, sending short messages to mobile phones, emails, messages on social networks, and the like. The location where weeds are identified to be informed to the departments/individual related to weed control may be a relatively precise geographic location, so as to facilitate accurate positioning.

In some embodiments, in order to reduce information harassment caused by inaccurate information to the relevant people or departments/individuals related to weed control, weeds may be re-recognized before reporting to improve accuracy. In response to determining that the weed is a malignant weed, the weed is re-recognized based on a pre-established weed feature database to obtain a revised or more detailed classification of the weed. According to the result of re-recognition, information about weed is output to government departments, enterprises, institutions and/or individuals related to weed control. Or, it is determined whether the weed is a malignant weed according to the result of the re-recognition, and if so, the information of the weed is output to the people related to the geographical location. In the method for re-recognition, the method for establishing a weed feature database, and the method for outputting information to the relevant people, or departments/individuals related to weed control may all be as described above.

Figure 2:
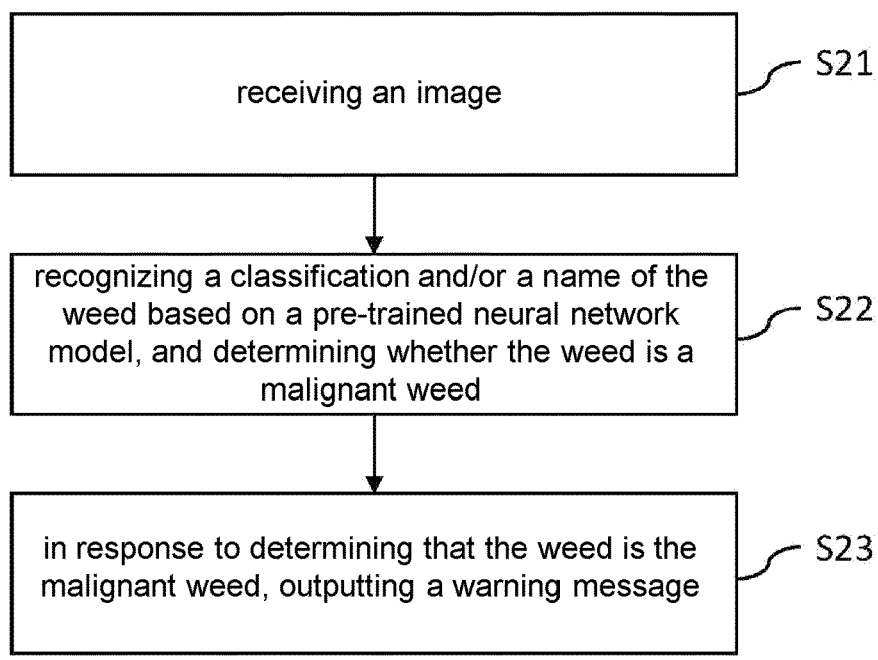
FIG. 2 is a flowchart schematically illustrating at least a portion of a computer-executable method related to weeds according to an embodiment of the present disclosure.

Referring to FIG. 2, FIG. 2 is a flowchart of a computer-executable method 200 related to weeds according to an embodiment of the present disclosure. The computer application performing the method 200 may be an application that provides the user with a recognizing and warning function directed at malignant weeds. The application may output a warning message when the application identifies malignant weeds. In some embodiments, the application may further provide information to the relevant people and/or weed control departments/individuals after identifying malignant weeds. In method 200, the application may predefine the scope of malignant weeds. For example, if the application is only directed at invasive weeds, it may be pre-defined that the malignant weeds include only invasive weeds; if the application is only directed at weeds that are more harmful to humans, it may be pre-defined that the malignant weeds include noxious weeds and allergenic weeds. The method 200 includes steps S21 to S23, and step S21 is similar to step S11, and steps S22 to S23 are described as follows.

Step S22: The classification and/or name of the weeds in the image is recognized based on the pre-trained neural network model, and it is determined whether the weeds are malignant weeds, and the neural network model is trained based on the pre-established weed sample library. The weed sample library includes image samples of various weeds, and each image sample may include an image showing at least a part of the targeted weed, and labeled information corresponding to the weed. For example, the image may include any one of at least one of the roots, stems, leaves, flowers, fruits, and seeds of the weeds to be recognized or a combination of the above. In the weed sample library, a certain number of image samples need to be collected for each classification of weeds. The greater the number of samples collected, the more accurate the recognition result may be.

In addition to collection of a certain number of samples for different parts of weeds (roots, stems, leaves, flowers, fruits, seeds), various environmental conditions may be taken into consideration when obtaining image samples. For example, image samples obtained for each classification of weeds may include images from different viewing angles, under different lighting conditions, at different growth stages, in different seasons (since the appearance of weeds in the same classification may be different in different seasons), under different weather (because the appearance of weeds of the same classification may be different in snowy and sunny days), at different times of a day (because the appearance of weeds of the same classification may be different in the morning and at night), in different growing environments (because the appearance of weeds of the same classification may be different when growing in indoor environment and outdoor environment), and at different geographic locations (because the appearance of weeds of the same classification may be different when growing on the south and north sides of a mountain). In addition to the classification of weeds and the parts of weeds, the corresponding information labeled for each image sample may further include the observation angle, lighting conditions, growth stage, season, weather, times of a day, growth environment, and geographic location of the weeds in the image sample.

The neural network model used in step S22 may be trained based on the weed sample library using any known method. For example, the neural network model may be trained as described in step S12 above. For the method for identifying weeds based on the neural network model in step S22, reference may be made to the description in step S12. Whether a weed is a malignant weed may be determined by querying the data in the previously described database, data sheet or data file that records the weed.

Step S23: In response to determining that the weed is a malignant weed, a warning message is output. In some embodiments, outputting the warning message may include outputting the warning message to a user currently using the application. For example, information may be output to prompt the user not to approach the weeds, information may be output to inform the user of the harm of the weeds, and/or information may be output to inform the user that the weeds are malignant weeds. For example, the text 404 in FIG. 4, the warning of hazard 607 and the description of the hazard 608 in FIG. 6 may all be examples of outputting the warning message. In some embodiments, outputting the warning message may include outputting information about the classification and/or name of the weed, the geographic location where the weed is identified, appearance, and hazard information to geographically relevant people. In some embodiments, outputting the warning message may include outputting the classification and/or name of the weed, as well as the geographic location where the weed is identified, to government departments, enterprises, institutions, and/or individuals related to weed control, and may also include outputting information about current growth stage of weeds, control measures, and/or recommended times for performing control.

Figure 3:
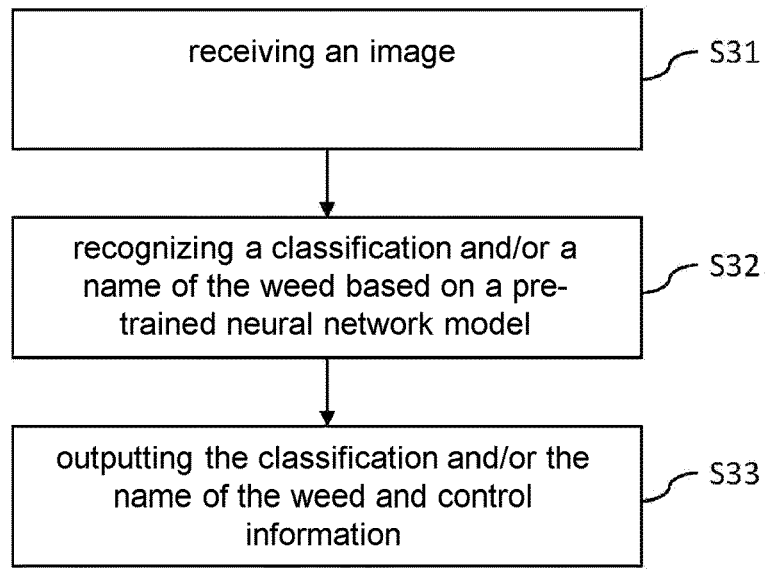
FIG. 3 is a flowchart schematically illustrating at least a portion of a computer-executable method related to weeds according to an embodiment of the present disclosure.

Referring to FIG. 3, FIG. 3 is a flowchart of a computer-executable method 300 related to weeds according to an embodiment of the present disclosure. The computer application executing the method 300 may be an application oriented to a weed control department/individual, and its function includes outputting professional guidance information related to weeds. The method 300 includes: step S31: receiving an image; step S32: recognizing the classification and/or name of weeds in the image based on a pre-trained neural network model, and the neural network model is trained based on a pre-established weed sample library; and step S33: outputting the classification and/or name of the weeds, and at least one of the following control information: current growth stage, hazard, methods to avoid harm, control measures, and recommended time for performing control.

Figure 7:
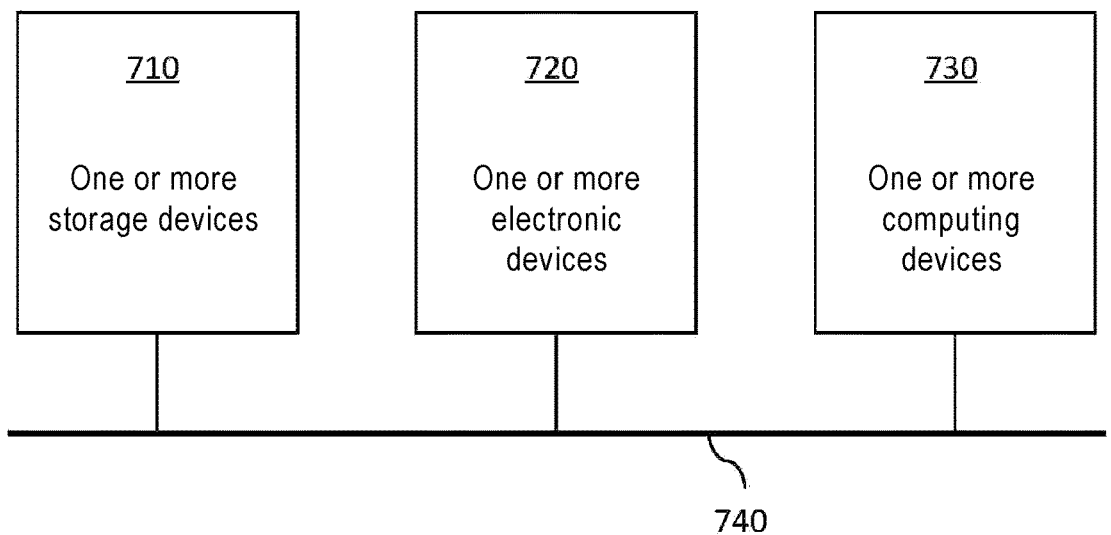
FIG. 7 is a structural view schematically illustrating at least a portion of a computer system related to weeds according to an embodiment of the present disclosure.

FIG. 7 is a structural view schematically illustrating at least a portion of a computer system 700 related to weeds according to an embodiment of the present disclosure. Those skilled in the art should understand that the system 700 is merely an example and should not be construed as limiting the scope of the disclosure or the features described herein. In this example, the system 700 may include one or more storage devices 710, one or more electronic devices 720, and one or more computing devices 730, which may be communicatively connected to each other through a network or bus 740. The one or more storage devices 710 provide storage services for the one or more electronic devices 720 and the one or more computing devices 730. Although the one or more storage devices 710 are shown in the system 700 in a separate block independent of the one or more electronic devices 720 and the one or more computing devices 730, it should be understood that the one or more storage devices 710 may actually be stored in any of other entities 720 and 730 included in the system 700. Each of the one or more electronic devices 720 and the one or more computing devices 730 may be located at different nodes of the network or bus 740 and be capable of communicating directly or indirectly with other nodes of the network or bus 740. Those skilled in the art should understand that the system 700 may further include other devices not shown in FIG. 7, and each of the different devices is located at a different node of the network or bus 740.

The one or more storage devices 710 may be configured to store any of the data described above, including but not limited to: image and metadata thereof, neural network models, various sample sets/sample libraries, databases/data sheets/data files that record weeds, weed feature database, application program files, etc. The one or more computing devices 730 may be configured to perform one or more of the methods 100, 200, and 300 described above, and/or one or more steps of the one or more of the methods 100, 200, and 300. The one or more electronic devices 720 may be configured to provide services to users, and the services may be displaying screens 400, 500, and 600 as described above. The one or more electronic devices 720 may further be configured to perform one or more steps of the methods 100, 200, and 300.

The network or bus 740 may be any wired or wireless network and may also include cables. The network or bus 740 may be part of the Internet, the World Wide Web, a specific intranet, a wide area network, or a local area network. The network or bus 740 may utilize standard communication protocols such as Ethernet, WiFi, and HTTP, protocols that are proprietary to one or more companies, and various combinations of the foregoing. The network or bus 740 may further include, but is not limited to, an Industry Standard Architecture (ISA) bus, a Microchannel Architecture (MCA) bus, an Enhanced ISA (EISA) bus, a Video Electronics Standards Association (VESA) local bus, and peripheral component interconnects (PCI) bus.

Figure 8:
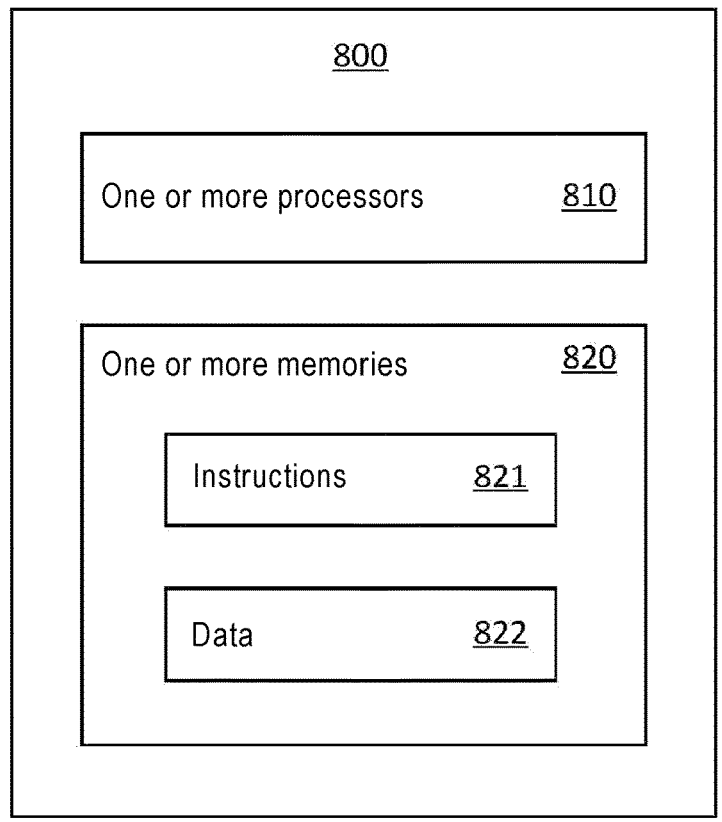
FIG. 8 is a structural view schematically illustrating at least a portion of a computer system related to weeds according to an embodiment of the present disclosure.

Each of the one or more electronic devices 720 and the one or more computing devices 730 may be configured in a similar way like the system 800 shown in FIG. 8, that is, configured with one or more processors 810, one or more memories 820, and instructions and data. Each of the one or more electronic devices 720 and the one or more computing devices 730 may be a personal computing device intended for use by a user or a business computer device used by an enterprise, and has all components adopted by a personal computing device or in combination with a business computer device, such as a central processing unit (CPU), memory that stores data and instructions (e.g., RAM and internal hard drives), such as a display (e.g., a monitor with a screen, touch screen, projector, television, or other devices operable to display information), mouse, keyboard, touch screen, microphone, speakers, and/or one or more I/O devices such as a network interface device, etc.

The one or more electronic devices 720 may further include one or more cameras for capturing static images or recording video streams, as well as all components for connecting these elements to each other. While one or more of the electronic devices 720 may each include a full-sized personal computing device, they may optionally include a mobile computing device capable of wirelessly exchanging data with a server over a network such as the Internet. For example, the one or more electronic devices 720 may be a mobile phone, or a device such as a PDA with wireless support, a tablet PC, or a netbook capable of obtaining information via the Internet. In another example, the one or more electronic devices 720 may be a wearable computing system.

FIG. 8 is a structural view schematically illustrating at least a portion of a computer system 800 related to weeds according to an embodiment of the present disclosure. The system 800 includes one or more processors 810, one or more memories 820, and other components (not shown) typically found in a computer or the like. Each of the one or more memories 820 may store content accessible by the one or more processors 810, including instructions 821 executable by the one or more processors 810, and data 822 retrieved, manipulated or stored by the one or more processors 810.

Instructions 821 may be any instruction set to be executed directly by the one or more processors 810, such as machine code, or any instruction set to be executed indirectly, such as scripts. The terms "instructions," "applications," "processes," "steps," and "programs" are used interchangeably herein. Instructions 821 may be stored in target code format for direct processing by the one or more processors 810, or stored in any other computer language, including scripts or collections of stand-alone source code modules interpreted on demand or compiled ahead of time. Instructions 821 may include instructions that cause, for example, the one or more processors 810 to function as various neural networks herein. The functions, methods, and routines of instructions 821 are explained in further detail elsewhere in the specification.

The one or more memories 820 may be any temporary or non-transitory computer readable storage medium capable of storing content accessible by the one or more processors 810, such as a hard drive, a memory card, ROM, RAM, DVD, CD, USB memory, writable memory and read-only memory, etc. One or more of the one or more memories 820 may include a distributed storage system, and instructions 821 and/or data 822 may be stored in a plurality of different storage devices that may be physically located in the same or different geographic locations. One or more of the one or more memories 820 may be connected to the one or more processors 810 via a network, and/or may be directly connected to or incorporated into any of the one or more processors 810.

The one or more processors 810 may retrieve, store or modify data 822 in accordance with instructions 821. The data 822 stored in the one or more memories 820 may include at least a portion of one or more of the items stored in the one or more storage devices 710 described above. For example, although the subject matter described herein is not limited to any particular data structure, the data 822 may also be stored in a computer register (not shown), and stored in a relational type database as a table or XML document with many different fields and records. Data 822 may be formatted in any computing device readable format, such as, but not limited to, binary values, ASCII, or Unicode. Further, data 822 may include any information sufficient to identify relevant information, such as numbers, descriptive text, proprietary codes, pointers, references to data stored in other memory, such as at other network locations, or used by functions to compute relevant information data information.

The one or more processors 810 may be any conventional processor, such as a commercially available central processing unit (CPU), graphics processing unit (GPU), or the like. Alternatively, the one or more processors 810 may also be special-purpose components, such as application specific integrated circuits (ASICs) or other hardware-based processors. Although not required, the one or more processors 810 may include specific hardware components to perform certain computational processes faster or more efficiently, such as image processing of images, and the like.

Although FIG. 8 schematically illustrates the one or more processors 810 and the one or more memories 820 in the same block, the system 800 may actually include multiple processors or memories within the same physical housing or multiple different physical housings. For example, one of the one or more memories 820 may be a hard drive or other storage medium located in a different housing than the housing of each of the one or more computing devices (not shown) described above. Accordingly, reference to a processor, computer, computing device or memory should be construed to include reference to a collection of processors, computers, computing devices or memories that may or may not operate in parallel.

The word "A or B" in the specification and claims includes "A and B" and "A or B" rather than exclusive inclusion of only "A" or only "B" unless specifically stated otherwise.

In this disclosure, reference to "an embodiment" or "some embodiments" means that a feature, structure or characteristic described in connection with the embodiment is included in at least one embodiment, and at least some embodiments of the present disclosure. Thus, the phrases "in an embodiment" and "in some embodiments" used in various paragraphs in this disclosure are not necessarily referring to the same embodiment or identical embodiments. Furthermore, the features, structures or characteristics may be combined in any suitable combination and/or subcombination in one or more embodiments.

As used herein, the word "exemplary" means "serving as an example, instance, or illustration" rather than as a "model" to be exactly reproduced. Any implementation illustratively described herein is not necessarily to be construed as preferred or advantageous over other implementations. Furthermore, the present disclosure is not to be limited by any expressed or implied theory presented in the preceding technical field, background, summary or detailed embodiments.

Additionally, certain terms may also be used in the following description for reference purposes only, and are thus not intended to be limiting. For example, the terms "first," "second," and other such numerical terms referring to structures or elements do not imply a sequence or order unless the context clearly dictates otherwise. It should also be understood that the term "comprising/including" used herein indicates the presence of the indicated feature, entity, step, operation, unit and/or component, but does not preclude the presence or addition of one or more other features, entities, steps, operations, units and/or components and/or combinations thereof.

In this disclosure, the terms "component" and "system" are intended to refer to a computer-related entity, or hardware, a combination of hardware and software, software, or software in execution. For example, a component may be, but is not limited to, a process, an object, an executable state, a thread of execution, and/or a program, etc. running on a processor. By way of example, both an application running on a server and the server may be one component. One or more components may exist within an executing process and/or thread, and a component may be positioned on one computer and/or distributed between two or more computers.

Those skilled in the art will be aware of that the boundaries between the operations described above are merely illustrative. Multiple operations may be combined into a single operation, and a single operation may be distributed among additional operations, and operations may be performed at least partially overlapping in time. Furthermore, alternative embodiments may include multiple instances of a particular operation, and the order of operations may be changed in other various embodiments. However, other modifications, changes and substitutions are equally possible. Accordingly, the specification and drawings are to be regarded in an illustrative rather than a restrictive sense.

In addition, the embodiments of the present disclosure may also include the following examples:

1. A computer-executable method related to weeds, including:
receiving images;
recognizing one or more plants in the image to obtain the classification and/or name of the plant, and determining whether the plant is a weed; and
in response to determining that the at least one plant is a weed, outputting information indicating that the at least one plant is a weed.

2. The method according to 1, characterized in further including:
in response to determining that at least one plant is a weed, determining whether the weed is a malignant weed; and
in response to determining that the weed is a malignant weed, outputting information indicating that the weed is a malignant weed.

3. The method according to 2, characterized in that the malignant weeds include noxious weeds, thorny weeds, allergenic weeds, and invasive weeds.

4. The method according to 2, characterized in further including: in response to determining that the weed is a malignant weed, outputting the classification and/or name of the weed and the geographic location where the weed is identified to the geographically relevant people.

5. The method according to 4, characterized in further outputting at least one of the following items of the weeds: a common form, a form matching the current growth stage, a hazard, and a method of avoiding the hazard.

6. The method according to 2, characterized in further including: in response to determining that the weeds are malignant weeds, outputting classification and/or name, geographic location of occurrence, and control measures of the weeds to government departments, enterprises, institutions, and/or individuals related to weed control.

7. The method according to 6, characterized in further outputting the current growth stage of the weeds, wherein the control measures are control measures matched with the current growth stage.

8. The method according to 6, characterized in that the control measures include optimal removal measures, wherein the recommended implementation time and/or implementation urgency of the optimal removal measures are also output.

9. The method according to 2, characterized in further including:
in response to determining that the weed is a malignant weed, re-recognizing the weed based on a pre-established weed feature database to obtain a revised classification or a more detailed classification of the weed; and
outputting information of the weed to government departments, enterprises, institutions, and/or individuals related to weed control according to the result of the re-recognition.

10. The method according to 9, characterized in further including:
determining whether the weed is a malignant weed according to the result of the re-recognition; and
in response to determining that the weed is a malignant weed, outputting information about the weed to geographically relevant people.

11. The method according to 1, characterized in that the step of obtaining the classification of the plant includes obtaining the species of the plant, and the step of determining whether the plant is a weed includes:
in response to the species of the plant being pre-recorded as a weed, determining that the plant is a weed; or
in response to the species of the plant not being pre-recorded as a weed, but other classifications subordinate to the higher-level classification of the species are pre-recorded as weeds, outputting information to prompt the user to input an additional image including the plant, and determining whether the plant is a weed based on the additional image, or based on the image and the additional image.

12. The method according to 1, characterized in further including:
in response to the classification of the plant not being pre-recorded as a weed, but other classifications subordinate to the higher-level classification of the classification are pre-recorded as weeds, outputting information to government departments, enterprises, institutions, and/or individuals related to weed control to inform the presence of family of weeds.

13. The method according to 1, characterized in further including:
in response to a user's operation, re-recognizing the weed based on a pre-established weed feature database to obtain a revised classification or a more detailed classification of the weed; and
outputting the result of the re-recognition.

14. The method according to 1, characterized in further including:
in response to determining that the at least one plant is a weed, recognizing a location of the at least one plant;
in response to recognizing that the location of weed is a private place, outputting the classification and/or name, hazard, and control measures of the weed; and
in response to recognizing that the location of weed is a public place, outputting the contact information of government departments, enterprises, institutions, and/or individuals related to weed control.

15. The method according to 1, characterized in further including: in response to determining that at least one plant is a weed, outputting information about the weed to a government department, enterprise, institution, and/or individual related to weed control.

16. The method according to 6, characterized in that the geographic location where the weeds appear is determined according to the geographic location where the image is captured.

17. The method of 1, characterized in that the recognition is based on a pre-trained neural network model.

18. The method according to 17, characterized in further including:
performing target detection on the image prior to the recognition; and performing the recognition on the detected one or more targets, respectively.

19. The method according to 9, characterized in that the re-recognition is based on a neural network model, and the neural network model is pre-trained based on a pre-established weed feature database.

20. A computer-executable method related to weeds, including:
receiving images;
recognizing the classification and/or name of the weed in the image based on a pre-trained neural network model, and determining whether the weed is a malignant weed, wherein the neural network model is trained based on a pre-established weed sample library; and
in response to determining that the weed is a malignant weed, outputting a warning message.

21. The method according to 20, characterized in that the step of outputting warning message includes:
outputting a message to prompt the user not to approach the weed;
outputting a message to inform the user of the hazards of the weeds; and/or
outputting a message to inform the user that the weed is a malignant weed.

22. The method according to 20, characterized in that the step of outputting the warning message includes: outputting the classification and/or name of the weeds, the geographic location where the weed appears, the appearance, and the hazards to the geographically related people.

23. The method according to 20, characterized in that the step of outputting the warning message includes: outputting the classification and/or name of the weeds, as well as the geographical location where the weeds appear to government departments, enterprises, institutions, and/or individuals related to weed control.

24. The method according to 23, characterized in that the step of outputting the warning message further includes: outputting the current growth stage, control measures, and/or the recommended time of controlling the weeds to government departments, enterprises, institutions, and/or individuals related to weed control.

25. A computer-executable method related to weeds, including:
receiving images;
recognizing the classification and/or name of the weed in the image based on a pre-trained neural network model, wherein the neural network model is trained based on a pre-established weed sample library; and
outputting the classification and/or name of the weed, and at least one of the following: current growth stage, hazard, methods to avoid hazard, control measures, and recommended control time.

26. A computer system related to weeds, including:
one or more processors; and
one or more memories configured to store a series of computer-executable instructions and computer-accessible data associated with the series of computer-executable instructions,
wherein, when the series of computer-executable instructions are executed by the one or more processors, the one or more processors are enabled to perform the method described in any one of 1-25.

27. A non-transitory computer-readable storage medium, characterized in that a series of computer-executable instructions are stored in the non-transitory computer-readable storage medium, wherein when the series of computer-executable instructions are executed by one or more computing devices, the one or more computing devices are enabled to perform the method described in any one of 1-25.

While some specific embodiments of the present disclosure have been described in detail by way of examples, those skilled in the art should understand that the above examples are provided for illustration only, and are not intended to limit the scope of the present disclosure. The various embodiments disclosed herein may be combined in any way without departing from the spirit and scope of the present disclosure. It will also be understood by those skilled in the art that various modifications may be made to the embodiments without departing from the scope and spirit of the present disclosure. The scope of the present disclosure is defined by the appended claims.

What is claimed is:

1. A computer-executable method related to a weed, comprising:
receiving an image;
recognizing one or more plants in the image to obtain a classification and/or a name of the plants, and determining whether the plants are the weed;
in response to determining that at least one of the plants is the weed, outputting information indicating that the at least one of the plants is the weed;
in response to a user's operation, re-recognizing the weed based on a pre-established weed feature database to obtain a revised classification or a more detailed classification of the weed; and
outputting a result of re-recognition.

2. The method according to claim 1, further comprising:
in response to determining that the at least one of the plants is the weed, determining whether the weed is a malignant weed; and
in response to determining that the weed is the malignant weed, outputting information indicating that the weed is the malignant weed, wherein the malignant weed comprises a noxious weed, a thorny weed, an allergic weed, and an invasive weed.

3. The method according to claim 2, further comprising:
in response to determining that the weed is the malignant weed, outputting a classification and/or a name of the weed and a geographic location where the weed appears to geographically relevant people; and
outputting at least one of the following items of the weed: a common form, a form matching a current growth stage, a hazard, and a method of avoiding the hazard.

4. The method according to claim 2, further comprising:
in response to determining that the weed is the malignant weed, outputting a classification and/or a name, a geographic location, and control measures of the weed to government departments, enterprises, institutions, and/or individuals related to weed control; and
outputting a current growth stage of the weed, wherein the control measures are control measures matched with the current growth stage.

5. The method according to claim 4, wherein the control measures comprise optimal removal measures, wherein a recommended implementation time and/or an implementation urgency of the optimal removal measures are further output.

6. The method according to claim 2, further comprising:
in response to determining that the weed is the malignant weed, re-recognizing the weed based on a pre-established weed feature database to obtain a revised classification or a more detailed classification of the weed; and outputting information of the weed to government departments, enterprises, institutions, and/or individuals related to weed control according to a result of re-recognition.

7. The method according to claim 6, further comprising:
determining whether the weed is the malignant weed according to the result of the re-recognition; and
in response to determining that the weed is the malignant weed, outputting the information of the weed to geographically relevant people.

8. The method according to claim 1, wherein the step of obtaining the classification of the plants comprises obtaining a species of the plants, and the step of determining whether the plants is the weed comprises:
in response to the species of the plants being pre-recorded as the weed, determining that the plants are the weed; or
in response to the species of the plants not being pre-recorded as the weed, but other classifications subordinate to a higher-level classification of the species are pre-recorded as the weed, outputting information to prompt a user to input an additional image comprising the plants, and determining whether the plants are the weed based on the additional image, or based on the image and the additional image.

9. The method according to claim 1, further comprising:
in response to the classification of the plants not being pre-recorded as the weed, but other classifications subordinate to a higher-level classification of the classification are pre-recorded as the weed, outputting information to government departments, enterprises, institutions, and/or individuals related to weed control to inform a presence of family of the weed.

10. The method according to claim 1, further comprising:
in response to determining that the at least one of the plants is the weed, recognizing a location of the at least one of the plants;
in response to recognizing that the location is a private place, outputting a classification and/or a name, a hazard, and control measures of the weed; and
in response to recognizing that the location is a public place, outputting contact information of government departments, enterprises, institutions, and/or individuals related to weed control, and/or
further comprising: in response to determining that the at least one of the plants is the weed, outputting information about the weed to the government departments, the enterprises, the institutions, and/or the individual related to the weed control.

11. The method according to claim 1, wherein recognition is based on a neural network model, and the neural network model is pre-trained based on a pre-established weed feature database.

12. The method according to claim 11, further comprising:
performing a target detection on the image prior to the recognition; and
performing the recognition on one or more targets, which are detected, respectively.

13. A computer system related to a weed, comprising:
one or more processors; and
one or more memories configured to store a series of computer-executable instructions and computer-accessible data associated with the series of computer-executable instructions,
wherein, when the series of computer-executable instructions are executed by the one or more processors, the one or more processors are enabled to perform the method claimed in claim 1.

14. A computer-executable method related to a weed, comprising:
receiving an image;
recognizing a classification and/or a name of the weed in the image based on a neural network model, which is pre-trained, and determining whether the weed is a malignant weed, wherein the neural network model is trained based on a pre-established weed sample library; and
in response to determining that the weed is the malignant weed, outputting a warning message;
wherein the step of outputting the warning message comprises: outputting the classification and/or the name of the weed, a geographic location where the weed appears, a form of the weed, and a hazard of the weed to geographically related people.

15. The method according to claim 14, wherein the step of outputting the warning message comprises:
outputting a message to prompt a user not to approach the weed;
outputting a message to inform the user of a hazard of the weed; and/or
outputting a message to inform the user that the weed is the malignant weed.

16. The method according to claim 14, wherein the step of outputting the warning message comprises: outputting the classification and/or the name of the weed, as well as a geographical location where the weed appears to government departments, enterprises, institutions, and/or individuals related to weed control.

17. The method according to claim 16, wherein the step of outputting the warning message further comprises: outputting a current growth stage, control measures, and/or a recommended time of controlling the weed to the government departments, the enterprises, the institutions and/or the individuals related to the weed control.

18. A computer-executable method related to a weed, comprising:
receiving an image;
recognizing a classification and/or a name of the weed in the image based on a neural network model, which is pre-trained, wherein the neural network model is trained based on a pre-established weed sample library;
outputting the classification and/or the name of the weed, and at least one of the following: a current growth stage, a hazard, methods to avoid the hazard, control measures, and a recommended control time;
in response to a user's operation, re-recognizing the weed based on a pre-established weed feature database to obtain a revised classification or a more detailed classification of the weed; and
outputting a result of re-recognition.

* * * * *